Figure 1:
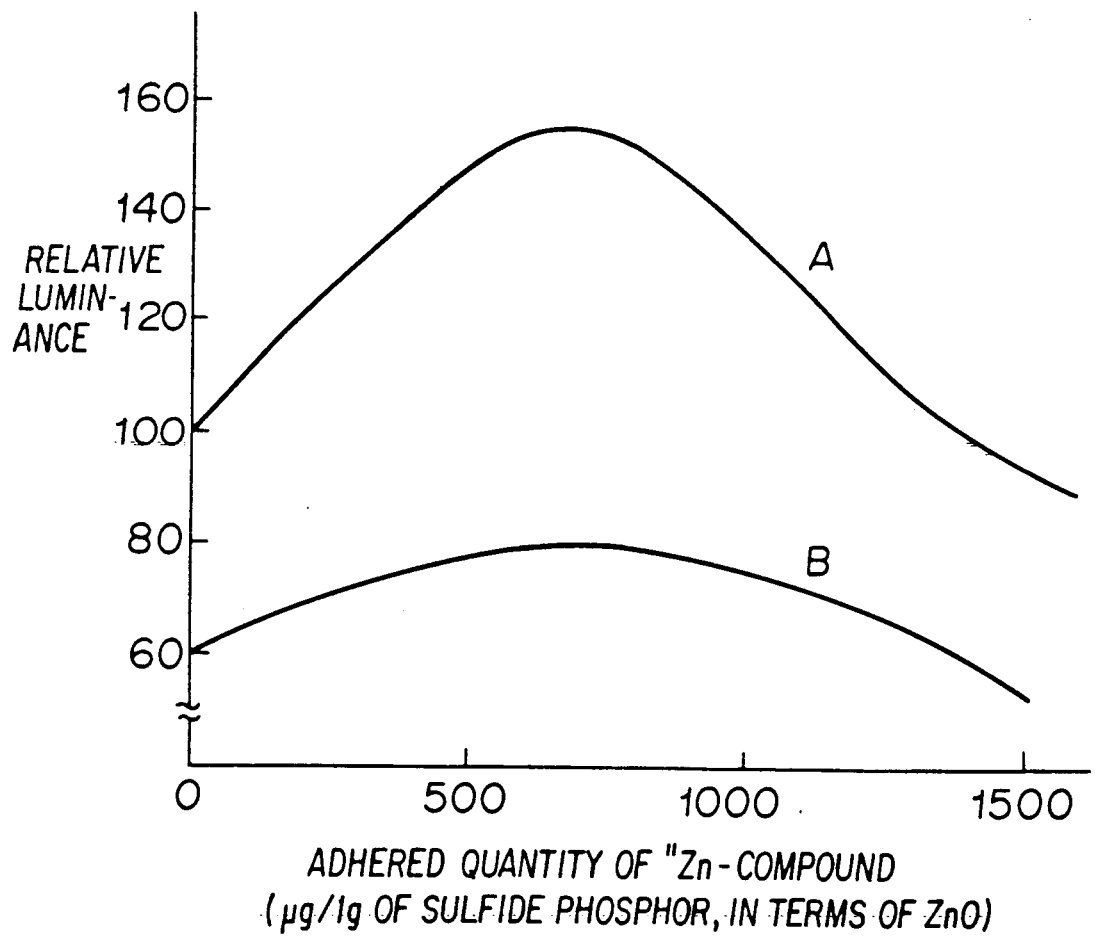

United States Patent [19]

Yoneshima et al.

[11] Patent Number: 5,006,277

[45] Date of Patent: Apr. 9, 1991

[54] FLUORESCENT COMPOSITION

[75] Inventors: Kunihiko Yoneshima, Hiratsuka; Fumio Takahashi, Odawara, both of Japan

[73] Assignee: Kasei Optonix, Ltd., Tokyo, Japan

[21] Appl. No.: 386,238

[22] Filed: Jul. 28, 1989

[30] Foreign Application Priority Data

Aug. 1, 1988 [JP] Japan ................................. 63-192375

[51] Int. Cl.$^5$ .............................................. C09K 11/62
[52] U.S. Cl. ............................................. 252/301.6 S
[58] Field of Search ................................. 252/301.6 S

[56] References Cited

U.S. PATENT DOCUMENTS

| | | | |
|---|---|---|---|
| 4,275,333 | 6/1981 | Kagami et al. | 252/301.6 S |
| 4,680,231 | 7/1987 | Yamamaura et al. | 428/407 |
| 4,791,336 | 12/1988 | Morimoto et al. | 252/301.6 S |
| 4,831,269 | 5/1989 | Kagami et al. | 252/301.6 S |

OTHER PUBLICATIONS

Database Derwent World Patent Index, AN 84-223103 (36), "Fluorescent Body for Producing Low Speed Electron Rays-".

*Primary Examiner*—Jack Cooper
*Attorney, Agent, or Firm*—Oblon, Spivak, McClelland, Maier & Neustadt

[57] ABSTRACT

A fluorescent composition having improved luminance, which is composed of a phosphor consisting essentially of a sulfide represented by the formula: $(Zn_{1-x}, Cd_x)S$, [wherein x is a number satisfying a condition of $0 \leq x \leq 1$], as the host material; and indium oxide ($In_2O_3$), both being mixed or adhered each other, and in which zinc oxide (ZnO) and/or a compound of zinc which can be converted to zinc oxide (ZnO) by heat-treatment is adhered onto the surface of said phosphor or the respective surfaces of said phosphor and said indium oxide.

3 Claims, 2 Drawing Sheets

FLUORESCENT COMPOSITION

The present invention relates to improvement in a fluorescent composition containing therein, as the principal component, a sulfide phosphor with zinc sulfide (ZnS), cadmium sulfide (CdS), or their solid-solution as the host material, and, in particular, exhibiting its light emitting property of high luminance under low-velocity electron beam excitation at an acceleration voltage of 1 kV or lower.

Those fluorescent composition, prepared by mixing electrically conductive materials such as indium oxide ($In_2O_3$), zinc oxide (ZnO), tin oxide ($SnO_2$), and others into a group of sulfide phosphors consisting essentially of a sulfide represented by the formula $(Zn_{1-x}, Cd_x)S$ [where: x is a number satisfying a condition of $0 \leq x \leq 1$], as the host material, which are activated by zinc (Zn), silver (Ag), gold (Au), copper (Cu), manganese (Mn), and so forth, and further co-activated by halogen, aluminum (Al), gallium (Ga), indium (In), and others (such sulfide phosphor consisting essentially of a sulfide represented by the formula $(Zn_{1-x}, Cd_x)S$ [where: x is a number satisfying a condition of $0 \leq x \leq 1$], as the host material, will hereinafter be abbreviated in its general term as "$(Zn_{1-x}, Cd_x)S$ series sulfide phosphor"), present their visible light emission at high luminance ranging from blue to red under a low-velocity electron beam excitation at its acceleration voltage of a few hundred volts or lower by changing the solid-solution ratio (x value) of zinc (Zn) to cadmium (Cd) in the host material of $(Zn_{1-x}, Cd_x)S$ series sulfide phosphor which is the principal component of its fluorescent composition or by varying combination of the above-mentioned activator and co-activator (vide: Japanese Examined Patent Publication No. 33153/1984, Japanese Examined Patent Publication No. 33155/1984, Japanese Examined Patent Publication No. 44035/1987, Japanese Examined Patent Publication No. 53554/1987, and so forth). On account of this, such fluorescent compositions have recently been made much use of as the fluorescent screen of fluorescent display tubes for automobiles, audio-visual appliances, video-tape recorders (VTR), and so forth, which are capable of multi-color displaying in combination with ZnO:Zn, which has practically been used since old as the phosphor material to emit green-white light.

However, when a multi-color fluorescent display tube is constructed by providing the fluorescent screen made up of ZnO:Zn which emits green-white light, and a fluorescent screen which is made up of a fluorescent composition containing therein, as the principal constituent, $(Zn_{1-x}, Cd_x)S$ series sulfide phosphor, as the other light-emitting color component such as, for example, a yellow light~red light emitting component, the luminance of a portion to be displayed in yellow~red is still lower than that of a portion to be displayed in green-white with the consequence that readability of this portion is yet to be improved.

Further, when the fluorescent display tube which is constructed by use of the fluorescent composition containing therein, as the principal component, these $(Zn_{1-x}, Cd_x)S$ series sulfide phosphors is employed as the display element for the meters to be mounted in automotive vehicles, the fluorescent display tube is still insufficient in its luminance, because of limitation to the acceleration voltage to be imposed on the display tube in connection with a power source to be used. This poses a problem of lacking in readability of a displayed image under the external day-light. On account of this, there has been a strong demand to much more improvement in luminance of the fluorescent composition which is capable of emitting light in other colors than green-white.

The present invention has been made in view of such circumstances as mentioned above, and aims at providing a fluorescent composition of improved quality containing therein the $(Zn_{1-x}, Cd_x)S$ series sulfide phosphor as the principal component, and which emits light with higher luminance than that of the conventional fluorescent component, particularly when it is excited with a low-velocity electron beam at its acceleration voltage of 1 kV or below.

With a view to attaining the above-mentioned object, the present inventors have made strenuous efforts in researching and studying the kinds of the electrically conductive materials to be mixed with the $(Zn_{1-x}, Cd_x)S$ series sulfide phosphor and the method of blending these materials as well. As the result, they have found out that the fluorescent composition obtained by mixin9 an electrically conductive material consisting of indium oxide ($In_2O_3$), and zinc oxide (ZnO) or compounds of zinc which can be converted to ZnO by heat-treatment (such compounds will hereinafter be called in general term "Zn-compound") with $(Zn_{1-x}, Cd_x)S$ series sulfide phosphor, unexpectedly improved its luminance in comparison with conventional fluorescent compositions obtained by mixing $In_2O_3$, ZnO, or other well-known electrically conductive materials alone with the $(Zn_{1-x}, Cd_x)S$ series sulfide phosphor; and that the synergistic effect to be derived from the selective mixing of these three components, i.e., $(Zn_{1-x}, Cd_x)S$ series sulfide phosphor, $In_2O_3$ and "Zn-compound", becomes particularly eminent when the "Zn-compound" is caused to adhere onto, at least, the surface of the $(Zn_{1-x}, Cd_x)S$ series sulfide phosphor, not by simple mixing of these three components. On the basis of this finding, the present inventors have arrived at the present invention.

That is to say, the fluorescent composition according to the present invention is characterized in that $(Zn_{1-x}, Cd_x)S$ series sulfide phosphor and $In_2O_3$ are mixed together or caused to adhere each other, and that a "Zn-compound" is adhered onto the surface of the above-mentioned phosphor or the respective surfaces of the above-mentioned phosphor and $In_2O_3$.

Figure 2:
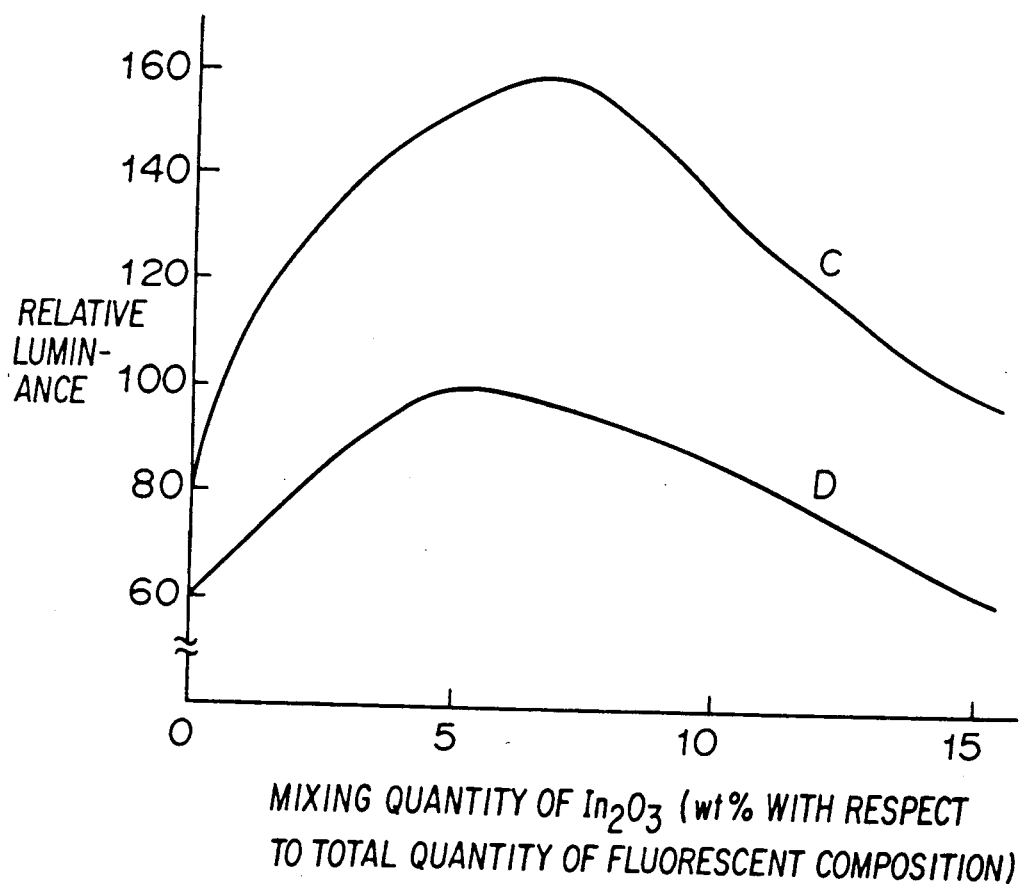

Preferred ways of carrying out the present invention are described in detail hereinbelow with reference to the accompanying drawings which illustrate specific examples, in which:

FIG. 1 is a graphical representation showing a relationship between the quantity of the "Zn-compound" adhered on the fluorescent composition of the present invention and the luminance of the fluorescent composition; and FIG. 2 is also a graphical representation showing a relationship between the quantity of $In_2O_3$ to be mixed with the fluorescent composition according to the present invention and the luminance of the fluorescent composition.

In the following, explanations will be given as to the method for producing the fluorescent composition according to the present invention.

As the $(Zn_{1-x}, Cd_x)S$ series sulfide phosphor according to the present invention, there may be used any of known sulfides such as those sulfide host materials represented by the formula of: $(Zn_{1-x}, Cd_x)S$, actual examples of which are ZnS:Zn; ZnS:Ag, Cl; ZnS:Ag, Cl, Li; ZnS:Ag, Al; ZnS:Mn, Cl; (Zn,Cd)S:Cu, Al; (Zn,Cd)S:Au, Al; (Zn,Cd)S:Au, Cu, Al; CdS:Ag, and so forth, which have been activated by an activator such as zinc (Zn), silver (Ag), copper (Cu), gold (Au), manganese (Mn), and other, and which have further been co-activated, depending on necessity, by a first co-activator such as aluminum (Al), halogen (Cl, Br, I, or F), and so forth, as well as a second co-activator such as alkaline metals (Li, Na, K, Rb or Cs), gallium (Ga), indium (In), and so on. Of these various sulfide compounds, preferred use may be made of the sulfide phosphors with the solid-solution of ZnS and CdS as the host material, with the value of x in the above-mentioned composition formula being in a range of $0.4 \leq x \leq 0.85$, or more preferred use may be made of the $(Zn_{1-x}, Cd_x)S$: Ag series sulfide phosphors with the value of x being in the above-mentioned range, and which have been activated by 200 to 2,000 μg of silver (Ag) per 1 g of the host material, when the highest luminance can be attained with such phosphor compound.

Further, in the fluorescent composition of the present invention, as the "Zn-compounds" to be adhered on the surface of the $(Zn_{1-x}, Cd_x)S$ series sulfide phosphor or on the surface of a mixture of this sulfide phosphor and $In_2O_3$, or on the surface of a combination of these two materials adhered each other, there may be used zinc oxide (ZnO) or compounds of zinc, at least one portion of which can be converted to ZnO by thermal decomposition due to heat-treatment at a temperature ranging from 100° C. to 700° C., such as hydroxides, sulfates, nitrates, acetates, oxalates, carbonates, halogenides of zinc (Zn), or double salts of these compounds (hydroxy chloride, zinc hydroxysulfate, and other hydroxy salts). From the standpoint of luminance of the fluorescent composition to be obtained, however, at least one portion of these "Zn-compounds" should preferably be zinc oxide (ZnO), zinc hydroxide $\{Zn(OH)_2\}$, or double salts (hydroxy salt) containing therein $Zn(OH)_2$. Accordingly, even when other "Zn-compounds"(such as sulfates, nitrates, etc.) are adhered onto the surface of the $(Zn_{1-x}, Cd_x)S$ series sulfide phosphor, or to both surfaces of this sulfide phosphor and $In_2O_3$, it will be more preferable that the phosphor compound is subjected to alkaline treatment or heat-treatment so that at least one portion thereof may be converted to ZnO, $Zn(OH)_2$, hydroxy salt, and so forth.

As $In_2O_3$ to be used in the fluorescent composition according to the present invention, there may be used $In_2O_3$ reagent, or $In_2O_3$ obtained by calcination of salts of indium such as $In(NO_3)_3$, $InCl_3$, and so on. Besides these, there may also be used $In_2O_3$ activated with rare earth elements such as Eu, Ce, etc., or solid-solution of $In_2O_3$ and $SnO_2$, as disclosed in, for example, Japanese Unexamined Patent Publication No. 110181/1980.

The fluorescent composition according to the present invention which is composed of a mixture of $(Zn_{1-x}, Cd_x)S$ series sulfide phosphor and $In_2Ohd 3$ can be obtained by various methods such that the $(Zn_{1-x}, Cd_x)S$ series sulfide phosphor having desired composition and a predetermined quantity of $In_2O_3$ is sufficiently mixed by use of a mortar, a ball mill, a mixer mill, and so forth; or $In_2O_3$ is adhered onto the surface of the $(Zn_{1-x}, Cd_x)S$ series sulfide phosphor by the known methods such use of gelatin and gum arabic, for example, as the adhesive agent (vide: Japanese Examined Patent Publication No. 3677/1979), the electrostatic coating method (vide: Japanese Examined Patent Publication No. 44275/1979), the method in which ethyl cellulose, nitro cellulose, and other organic binders are used (vide: Japanese Examined Patent Publication No. 33266/1987), and so forth. Subsequently, the thus obtained fluorescent composition and the "Zn-compound" are thrown into pure water and sufficiently agitated, after which the aqueous solution was filtered or dried by evaporation to thereby absorb the "Zn-compound" on the respective surface of the $(Zn_{1-x}, Cd_x)S$ series sulfide phosphor and $In_2O_3$, and finally the solid phosphor is subjected to heat treatment at a temperature ranging from 130° C. to 700° C.

As a more preferred method, water-soluble "Zn-compound" such as sulfate, nitrate, halide, etc. of zinc (Zn) is added, as the above-mentioned "Zn-compound", to aqueous suspension of the fluorescent composition consisting of the $(Zn_{1-x}, Cd_x)S$ series sulfide phosphor and $In_2O_3$; then $NH_4OH$, NaOH and other alkalis, ammonium carbonate, oxalic acid, and so on are added to this solution to thereby deposite, on the respective surfaces of the $(Zn_{1-x}, Cd_x)S$ series sulfide phosphor and $In_2O_3$, the initially added "Zn-compound" in the form of its hydroxide, carbonate, oxalate, etc. which are difficult to dissolve in water; and, after the fluorescent composition with the deposited substance is filtered, it is heat-treated at a temperature ranging from 130° C. to 700° C. In this manner, the "Zn-compound" can be uniformly adhered onto the surface of the sulfide phosphor and $In_2O_3$, and the resulting fluorescent composition has its improved luminance.

Further, the fluorescent composition according to the present invention can also be produced by a method such that, in place of adhering the "Zn-compound" on the surface of the fluorescent composition obtained by mixing or adhering $In_2O_3$ with or onto the $(Zn_{1-x}, Cd_x)S$ series sulfide phosphor, as mentioned above, such "Zn-COmpound" is adhered beforehand on the surface of the $(Zn_{1-x}, Cd_x)S$ series sulfide phosphor, and then $In_2O_3$ ("Zn-compound" may also be adhered, in advance, to the surface of $In_2O_3$, as the case may be) is mixed with or adhered to the sulfide phosphor.

FIG. 1 is a graphical representation showing a relationship between the adhered quantity of the "Zn-compound" and the luminance of the fluorescent composition when it is excited with low-velocity electron beam at its accelerating voltage of 30V, for each of the fluorescent composition obtained by adhering the "Zn-compound" onto the surface of a mixture of $(Zn_{1-x}, Cd_x)S$ series sulfide phosphor and $In_2O_3$, and the $(Zn_{1-x}, Cd_x)S$ series sulfide phosphor with the "Zn-compound" being adhered on its surface. In FIG. 1, the curve A is of the fluorescent composition obtained by adhering, onto the surface of a mixture of $(Zn_{0.6}, Cd_{0.4})S$:Ag, Li, Cl phosphor and 5% by weight of $In_2O_3$, zinc oxide (ZnO) which is obtained by converting, through heat-treatment, a sedimentation deposited on the surface of a mixture by adding NaOH to aqueous solution of nitrate, in which this mixture is suspended. On the other hand, the curve B is of the fluorescent composition, for the purpose of comparison, made up of $(Zn_{0.6}, Cd_{0.4})S$:Ag, Cl, Li phosphor with ZnO alone (obtained in the same manner as mentioned above) being adhered onto the surface thereof. By the way, the luminance on the axis of ordinate is indicated in terms of a relative value, when the luminance of the conventional fluorescent composition made up of a mixture of ($Zn_{0.6}$, $Cd_{0.4}$)S:Ag, Cl, Li phosphor and $In_2O_3$ is taken as 100.

As is apparent from the comparison of the curves A and B in FIG. 1, the fluorescent composition obtained by adhesion of ZnO onto the surface of the mixture of ($Zn_{0.6}$, $Cd_{0.4}$)S:Ag, Cl, Li phosphor and $In_2O_3$ (curve A) is seen to have improved its luminance to a remarkable degree in comparison with the fluorescent composition obtained by adhesion of ZnO onto the surface of ($Zn_{0.6}$, $Cd_{0.4}$)S:Ag, Cl, Li phosphor, not containing therein $In_2O_3$. Moreover, within a range of the adhered quantity of ZnO being less than about 1,400 μg per 1 g of the sulfide phosphor, the luminance of the fluorescent composition is higher than that of the conventional fluorescent composition which is made up of $In_2O_3$ and )$Zn_{0.6}$, $Cd_{0.4}$)S:Ag, Li, Cl phosphor having no ZnO adhered thereon. In particular, the improvement in its luminance is remarkable when the adhered quantity of ZnO is in a range of from about 300 μg to 1,000 μg per 1 g of the sulfide phosphor.

FIG. 2 indicates a relationship between the mixing quantity of $In_2O_3$ and the luminance of the fluorescent composition when it is excited with low-velocity electron beam at its accelerating voltage of 30V, for each of the fluorescent composition made up of a mixture of ($Zn_{1-x}$, $Cd_x$)S series sulfide phosphor and $In_2O_3$, onto which surface the "Zn-compound" is adhered, and the conventional fluorescent composition also made up of ($Zn_{1-x}$, $Cd_x$)S series sulfide phosphor and $In_2O_3$, onto which surface no "Zn-compound" is adhered.

The curve C in FIG. 2 indicates a case, wherein 560 μg of ZnO per 1 g of the sulfide phosphor (prepared in the same manner as in the case with the fluorescent composition shown in FIG. 1) was adhered onto the surface of a mixture composed of ($Zn_{0.6}$, $Cd_{0.4}$)S:Ag, Cl, Li phosphor and $In_2O_3$ while the curve D indicates, for the purpose of comparison, a case of the conventional fluorescent composition having the same composition as that of the curve C, with the exception that no ZnO is adhered on its surface.

Incidentally, the axis of ordinate in the graph of FIG. 2 denotes the luminance of the fluorescent composition of the present invention in terms of a relative value, when the luminance of the conventional fluorescent composition composed of a mixture of ($Zn_{0.6}$, $Cd_{0.4}$)S:Ag, Cl, Li phosphor and 5 wt% of $In_2O_3$, without ZnO being adhered on its surface, is taken as 100.

As can be seen from FIG. 2, if the mixing quantity of $In_2O_3$ is the same, the luminance of the fluorescent composition with ZnO being adhered to its surface (curve C) is remarkably higher than that of the conventional fluorescent composition without ZnO being adhered on its surface (curve D). Moreover, when the mixing quantity of $In_2O_3$ is in a range of from about 0.5 to 15% by weight with respect to the total quantity of the fluorescent composition, it has a higher luminance than that of the adhered on its surface. In particular, when the mixing quantity is in a range of from 4 to 10% by weight with respect to the total quantity of the fluorescent composition, the luminance reaches its highest.

So far, explanations have been given with reference to a case, in which the ($Zn_{1-x}$, $Cd_x$)S series sulfide phosphor is ($Zn0.6$, $Cd_{0.4}$)S:Ag, Cl, Li phosphor, and the "Zn-compound" is ZnO obtained by heat-treatment of sedimentation produced from addition of an alkali to aqueous solution of $Zn(NO_3)$. It has also been verified that remarkable improvement in the luminance could be attained by the fluorescent composition of the present invention in comparison with that of the conventional fluorescent composition, when use is made of the ($Zn_{1-x}$, $Cd_x$)S series sulfide phosphor of other compositions than that mentioned above and the "Zn-compound" other than the above-mentioned ZnO, wherein the "Zn-compound" in a quantity of 1,400 μg or below (more preferably from 300 μg to 1,000 μg) in terms of a weight of ZnO per 1 g of the sulfide phosphor is adhered onto the surface of ($Zn_{1-xl}$, $Cd_x$)S series sulfide phosphor or onto both surfaces the sulfide phosphor and $In_2O_3$ of the fluorescent composition obtained by mixing or adhering 0.5 to 15% by weight (or more preferably from 4 to 10% by weight) of $In_2O_3$ with respect to the total quantity of the fluorescent composition, with or onto the ($Zn_{1-x}$, $Cd_x$)S series sulfide phosphor. In this way, there is realized a synergistically improved effect of luminance in the fluorescent composition, the one being an improved effect of luminance due to increase in the electric conductivity by $In_2O_3$ simple and the other being an improved effect of luminance due to increase in the electric conductivity by the Zn-compound simple. Such remarkable improvement in luminance as compared with that of the conventional fluorescent composition is assumed to be due to that presence of the "Zn-compound" which can be rendered electrically conductive would synergistically increase the electric conductivity of the sulfide phosphor as s whole, contrary to which the conventional fluorescent composition produced by mixing or adhering $In_2O_3$, ZnO or other electrically conductive substance alone, with or onto the sulfide phosphor has such electrically conductive substance adhered only partially on the surface of the phosphor, owing to which the electric conductivity of the sulfide phosphor as a whole was insufficient.

By the way, the fluorescent composition obtained by simply mixing predetermined quantities of the three components, i.e., ($Zn_{1-x}$, $Cd_x$)S series sulfide phosphor, $In_2O_3$ and "Zn-compound" is inferior in its luminance to the above-mentioned phosphor composition obtained by adhering the "Zn-compound" on the surface of ($Zn_{1-x}$, $Cd_x$)S series sulfide phosphor, or on both surfaces of the sulfide phosphor and $In_2O_3$, but is still higher than that of the conventional two-component system fluorescent compositions made up of a mixture of ($Zn_{1-x}$, $Cd_x$)S series sulfide phosphor and $In_2O_3$, or a mixture made up of the same sulfide phosphor and the "Zn-compound".

With a view to enabling those persons skilled in the art to put this invention into practice, the following preferred examples are presented. Table 1 below indicates each and every composition for the Examples and the Comparative Examples to be explained hereinbelow, and the relative luminance of each composition.

EXAMPLE 1

100 g of ($Zn_{0.6}$, $Cd_{0.4}$)S:Ag, Cl, Li phosphor was put into 400 ml of pure water, and the batch was agitated for about ten minutes, thereby preparing phosphor suspension liquid. Thereafter, separate from this phosphor suspension liquid, 200 mg of zinc sulfate [$ZnSO_4 \cdot 7H_2O$] was dissolved in 50 ml of pure water, and sufficiently agitated. After this, the thus obtained zinc sulfate solution was added to the above-mentioned phosphor suspension liquid. Subsequently, this liquid mixture was agitated for about ten minutes, followed by gradually adding NaOH to this phosphor suspension liquid to adjust the pH value of this phosphor suspension liquid to approximately 9, thereby depositing, on the surface of the phosphor, sedimentation of the Zn-compound which is difficult to dissolve in water.

After the suspension liquid was dehydrated, it was placed in a heat-resistant vessel to be baked for 24 hours in an electric furnace maintained at a temperature of 180° C. Subsequently, the baked substance was taken out and about 560 $\mu$g of Zn-compound per 1 g of the phosphor was adhered onto its surface.

In the next place, 95 parts by weight of the thus obtained $(Zn_{0.6}, Cd_{0.4})S:Ag, Cl, Li$ phosphor with the Zn-compound having been adhered to its surface and 5 parts by weight of $In_2O_3$ having an average particle size of 0.23 $\mu$m were sufficiently mixed in a ball mill, thereby preparing the fluorescent composition [I].

On the other hand, the fluorescent composition [II] was obtained in the same manner as in the fluorescent composition [I] above, with the exception that 105 g of the fluorescent composition obtained by mixing beforehand in a ball mill 95% parts by weight of $(Zn_{0.6}, Cd_{0.4})S:Ag, Cl, Li$ phosphor and 5 parts by weight of $In_2O_3$ having an average particle size of 0.24 $\mu$m was used in place of 100 g of $(Zn_{0.6}, Cd_{0.4})S:Ag, Cl, Li$ phosphor, by adhering 560 $\mu$g of the Zn-compound per 1 g of $(Zn_{0.6}, Cd_{0.4})S:Ag, Cl, Li$ phosphor onto both surfaces of the phosphor and $In_2O_3$.

COMPARATIVE EXAMPLE 1

For the sake of comparison, 95 parts by weight of $(Zn_{0.6}, Cd_{0.4})S:Ag, Cl, Li$ phosphor and 5 parts by weight of $In_2O_3$ having an average particle diameter of 0.24 $\mu$m were sufficiently mixed in a ball mill, thereby preparing the fluorescent composition [R-I].

COMPARATIVE EXAMPLE 2

For the purpose of further comparison, the fluorescent composition [R-II] was prepared in the same manner as in the fluorescent composition [I] above, with the exception that no $In_2O_3$ having an average particle size of 0.24 $\mu$m was mixed with the fluorescent composition [I] above, by adhering 560 $\mu$g of the Zn-compound per 1 g of the $(Zn_{0.6}, Cd_{0.4})S:Ag, Cl, Li$ phosphor to the surface of the phosphor.

The thus obtained fluorescent compositions [I], [II], [R-I] and [R-II] were respectively coated on a metal base plate by the precipitation coating method, thereby forming the fluorescent screen thereon. The metal base plate and the fluorescent screen formed thereon were then placed in a demountable low-velocity electron beam generating apparatus, and irradiated by low-velocity electron beam at its accelerating voltage of 30V. Measurement of the luminance at the time of the electron beam irradiation revealed the results as shown in Table 1 below, from which it is seen that the fluorescent compositions [I] and [II] made up of a mixture of the above-mentioned phosphor and $In_2O_3$ with the "Zn-compound" having been adhered on its surface exhibited remarkably high luminance in comparison with the conventional fluorescent compositions [R-I] and [R-II].

EXAMPLE 2

0.6 part by weight of gelatin dissolved in warm water at 40° C. to prepare 0.3% aqueous solution of gelatin. Thereafter, into this gelatin solution, there was added 95 parts by weight of $(Zn_{0.86}, Cd_{0.14})S:Au, Al$ phosphor and the batch was sufficiently agitated to obtain dispersion liquid of the phosphor.

On the other hand, 0.4 part by weight of gum arabic was dissolved in water to prepare 0.3% aqueous solution of gum arabic. Then, into this gum arabic solution, there was added 5 parts by weight of $In_2O_3$ having an average particle diameter of 0.24 $\mu$m, and the batch was sufficiently agitated to obtain dispersion liquid of $In_2O_3$ particles.

Subsequently, the above-mentioned dispersion liquid of phosphor and dispersion liquid of $In_2O_3$ wre mixed, while stirring, to adjust the pH value of the liquid mixture to 4. After cooling the liquid mixture down to 10° C. or below, 1 part by weight of formalin was added gradually, while stirring. Following removal of the supernatant liquid by decantation and wash of the sedimented substance with water, the solid component was dried to obtain the fluorescent composition with $In_2O_3$ having been adhered onto the $(Zn_{0.86}, Cd_{0.14})S:Au, Al$ phosphor.

Then 100 g of the fluorescent composition obtained in the above-mentioned manner was put into 400 ml of pure water, and, while the batch was being sufficiently agitated, 205 mg of zinc nitrate $\{Zn(NO_3)_2 \cdot 6H_2O\}$ was thrown into the batch, followed by further agitation for about ten minutes. After the agitation, $NH_4OH$ was gradually added to adjust the pH value of the liquid mixture to 9, thereby depositing, on the surface of the above-mentioned fluorescent composition, sedimentation of the "Zn-compound" which is difficult to dissolve in water.

Subsequently, the suspension liquid of the above-mentioned fluorescent composition was subjected to dehydration, after which the solid component was placed in a heat-resistant vessel and baked in an electric furnace maintained at a temperature of 180° C. for 24 hours. After this baking, the heat-treated component was taken outside. There was thus obtained the fluorescent composition [III] with approximately 589 $\mu$g of the Zn-compound per 1 g of the phosphor (in terms of ZnO) having been adhered to the both surfaces of the $(Zn_{0.86}, Cd_{0.14})S:Au, Al$ phosphor and $In_2O_3$.

COMPARATIVE EXAMPLE 3

Separate from the above-mentioned fluorescent composition [III], there was produced, for the purpose of comparison, a fluorescent composition [R-III] composed of $(Zn_{0.84}, Cd_{0.16})S:Au, Al$ phosphor, on the surface of which 14% by weight of $In_2O_3$ alone was adhered, in the same manner as in the case of producing the fluorescent composition [III], with the exception of omitting the above-mentioned process step of depositing, on the surface of the fluorescent composition, the "Zn-compound" which is difficult to dissolve in water, and then baking the compound to convert it into ZnO.

COMPARATIVE EXAMPLE 4

For further comparison, there was produced a fluorescent composition [R-IV] of $(Zn_{0.84}, Cd_{0.16})S:Au, Al$ phosphor, on the surface of which 840 $\mu$g of the Zn-compound per 1 g of the phosphor was adhered, in the same manner as in the case of producing the fluorescent composition [III], with the exception that use is made of the $(Zn_{0.84}, Cd_{0.16})S:Au, Al$ phosphor without $In_2O_3$ having been adhered to its surface, in place of the $(Zn_{0.84}, Cd_{0.16})S:Au, Al$ phosphor having $In_2O_3$ adhered thereto.

The thus obtained fluorescent compositions [III], [R-III] and [R-IV] were respectively coated on a metal base plate by the precipitation coating method, thereby forming a fluorescent screen thereon. The metal base plate and the fluorescent screen formed thereon were then placed in a demountable low-velocity electron beam generating apparatus, and irradiated by low-velocity electron beams at its accelerating voltage of 30V. Measurement of the luminance at the time of the electron beam irradiation revealed the results as shown in Table 1 below, from which it is seen that the fluorescent compositions [III] having the "Zn-compound" adhered on its surface exhibited remarkably high luminance in comparison with the conventional fluorescent composition [V-III] and [R-IV].

TABLE 1

| Fluorescent composition No. | Phosphor composition | Adhered quantity of "Zn-compound" (per 1 gr of phosphor; in terms of ZnO) | Mixing (or adhering) qty of $In_2O_3$ to total qty of fluorescent composition | Relative luminance |
|---|---|---|---|---|
| [I]     | $(Zn_{0.6}, Cd_{0.4})S:Ag,Cl,Li$ | 560 μg | 5 wt % | 140 |
| [II]    | " | " | " | 150 |
| [R-I]   | " | — | " | 100 |
| [R-II]  | " | 560 μg | — | 80 |
| [III]   | $(Zn_{0.86}, Cd_{0.14})S:Au,Al$ | 840 μg | 14 wt % | 135 |
| [R-III] | " | — | " | 100 |
| [R-IV]  | " | 840 μg | — | 75 |

Note 1:
No comparison can be made between the fluorescent compositions [R-I] and [R-III] in respect of their luminance
Note 2:
The adhered quantity of "Zn-compound" was calculated from the analysed value of Zn in the substance as adhered.

As has so far been described in detail above, the fluorescent composition according to the present invention, which is composed of $(Zn_{1-x}, Cd_x)S$ series sulfide phosphor and $In_2O_3$, with the "Zn-compound" being adhered on the surface of the $(Zn_{1-x}, Cd_x)S$ series sulfide phosphor or on both surfaces of the phosphor and $In_2O_3$, could remarkably improve its luminance under excitation by the low-velocity electron beams, hence it is extremely useful for the purpose of manufacturing a multi-color fluorescent display tube having luminance sufficient to perform its multi-color displaying.

We claim:

1. A fluorescent composition composed of a phosphor consisting essentially of a sulfide which is represented by the formula of :$(Zn_{1-x}, Cd_x)S$, wherein x is a number satisfying a condition of $0 \leq x \leq 1$, as the host material; and indium oxide ($In_2O_3$), said phosphor and indium oxide being mixed or adhered to each other, characterized in that zinc oxide (ZnO) and/or a compound of zinc which can be converted to zinc oxide (ZnO) by heat-treatment at a temperature of 100° C. to 700° C. is adhered onto the surface of said phosphor or the respective surfaces of said phosphor and said indium oxide, the adhered quantity of said zinc oxide (ZnO) and/or said compound of zinc which can be converted to zinc oxide (ZnO) by said heat-treatment being less than 1,400 μg per 1 g of said phosphor in terms of zinc oxide (ZnO), and the quantity of said indium oxide ($In_2O_3$) mixed with or adhered to said phosphor being in a range of from 0.5 to 15% by weight with respect to the total quantity of said fluorescent composition, said adhered quantity of zinc oxide and/or said compound of zinc being such as to effect a composition exhibiting a higher luminance than (1) the composition as defined above absent said zinc oxide and zinc compound, and (2) the composition as defined above absent indium oxide.

2. A fluorescent composition according to claim 1, characterized in that said compound of zinc which can be converted to zinc oxide (ZnO) by said heat-treatment is zinc hydroxide $\{Zn(Oh)_2\}$ and/or a double salt which contains therein zinc hydroxide $\{Zn(Oh)_2\}$.

3. A fluorescent composition according to claim 1, characterized in that an adhered quantity of said zinc oxide (ZnO) and/or said compound of zinc which can be converted to zinc oxide (ZnO) by said heat-treatment is in a range of from 300 to 1,000 μg per 1 g of said phosphor in terms of zinc oxide (ZnO).

* * * * *